(12) United States Patent
Carr et al.

(10) Patent No.: US 6,330,767 B1
(45) Date of Patent: Dec. 18, 2001

(54) UNLOADING SYSTEM FOR PARTICULATE MATERIALS BINS

(75) Inventors: Brian W. Carr, Nevada; Donald F. Handorf, Ames; Scott Sporrer, Nevada; Ryan D. Jensen, Huxley; Nick Merfeld, Nevada; Mark D. Mathis, Roland, all of IA (US)

(73) Assignee: Gary W. Clem, Inc., Nevada, IA (US)

( * ) Notice: Subject to any disclaimer, the term of this patent is extended or adjusted under 35 U.S.C. 154(b) by 0 days.

(21) Appl. No.: 09/442,785

(22) Filed: Nov. 18, 1999

(51) Int. Cl.[7] ....................................................... E04H 7/00
(52) U.S. Cl. ..................................... 52/192; 52/1; 52/195; 52/197; 198/506; 198/518; 198/572; 198/575; 198/603; 198/608; 198/657; 220/565; 222/56; 222/58; 222/64; 222/278
(58) Field of Search ................................... 52/1, 192, 195, 52/197; 198/506, 518, 572, 575, 603, 608, 657; 220/565; 222/56, 58, 64, 278

(56) References Cited

U.S. PATENT DOCUMENTS

| | | | |
|---|---|---|---|
| 1,785,287 | * | 12/1930 | Ryan et al. ........................ 198/608 X |
| 1,906,395 | * | 5/1933 | Meeks .................................... 198/608 |
| 2,551,216 | * | 5/1951 | Martin ................................ 52/197 X |
| 2,767,963 | * | 10/1956 | Ringen et al. .................... 198/657 X |
| 3,199,731 | * | 8/1965 | Brauer et al. ........................... 222/56 |
| 4,035,928 | * | 7/1977 | Sietmann et al. .................. 52/192 X |
| 4,669,941 | * | 6/1987 | West et al. ........................ 198/518 X |

* cited by examiner

*Primary Examiner*—Carl D Friedman
*Assistant Examiner*—Chi Nguyen
(74) *Attorney, Agent, or Firm*—Zarley, McKee, Thomte, Voorhees & Sease

(57) ABSTRACT

An apparatus for efficiently removing grain from a grain storage device, which uses a plurality of augers. An unloading auger is used to begin removal of grain from a grain storage device. As the amount of grain decreases, a proximity sensor sends an activation signal to a cross auger that rests horizontally on the bottom of the grain storage device. The cross auger will pull the remaining grain to the entry point of an unloading auger. The unloading auger then removes the grain from the grain storage device.

7 Claims, 2 Drawing Sheets

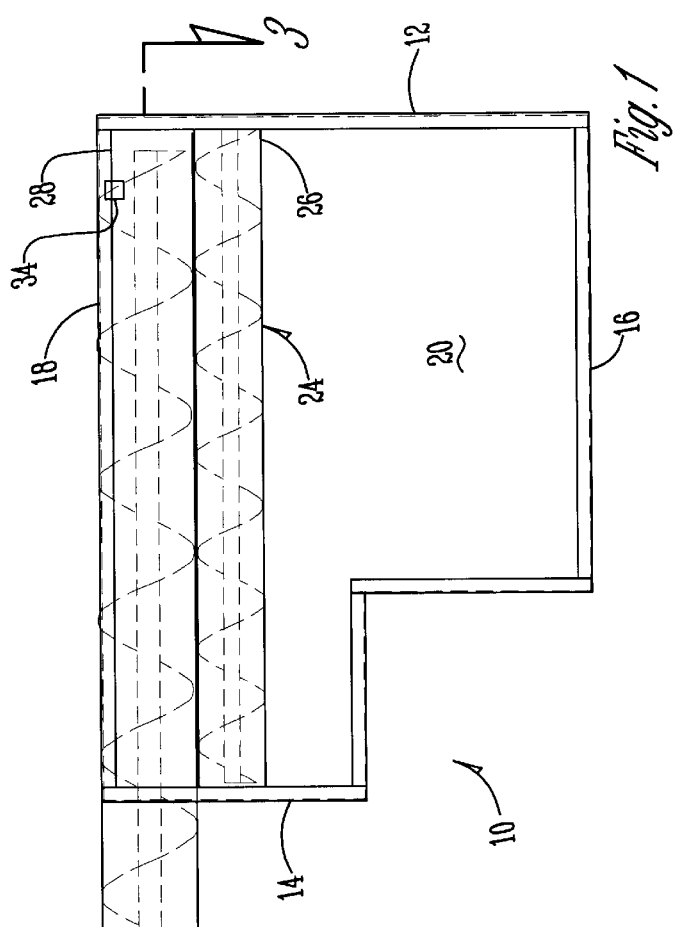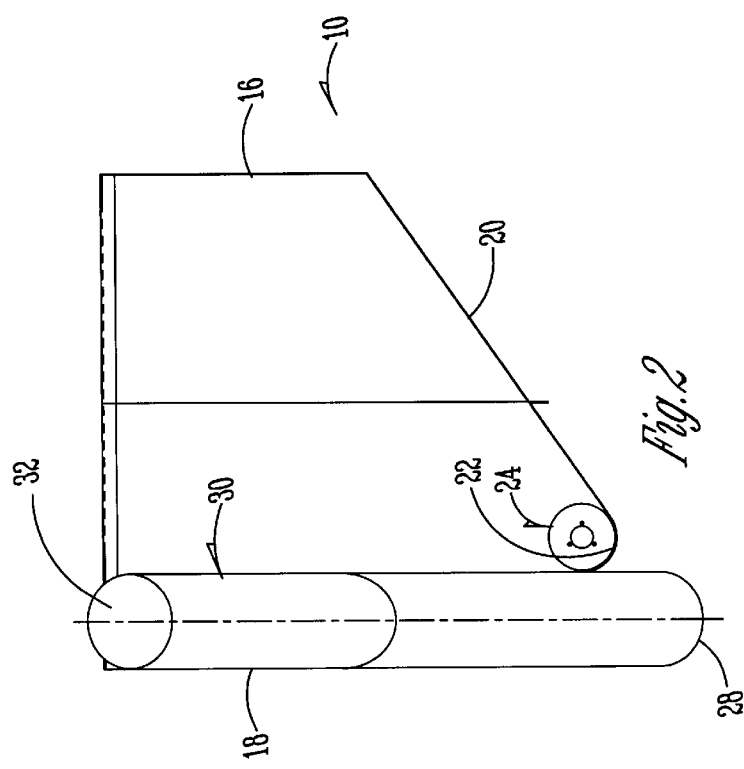

UNLOADING SYSTEM FOR PARTICULATE MATERIALS BINS

BACKGROUND OF THE INVENTION

1. Field of the Invention

This invention relates to grain bins, and in particular, to an apparatus for efficiently removing grain from a grain storage bin or compartment.

2. Background of the Invention

The configuration of certain grain compartments, such as on combines or the like, sometimes makes it difficult to remove entirely all the grain from all spaces within the compartment. Specifically, the shape of the bin often does not allow grain in some spaces within the bin to flow by gravity towards a discharge auger.

If grain is left in the dead spaces for a period of time, it may rot and will require a time consuming cleanup task before the storage device can be used again.

It is therefore a primary objective of the present invention to provide an apparatus for efficiently removing grain from an otherwise dead space in a storage bin or compartment.

Further objects, features, and advantages of the present invention include an apparatus as above described which removes the need for grain removal by hand; prevents loss of grain not extracted from a grain storage device; and which avoids cleanup of the storage bin after grain removal.

These and other objects, features, and advantages of the present invention will become more apparent with reference to the accompanying specification and claims.

SUMMARY OF THE INVENTION

An apparatus for efficiently removing grain from a grain storage device, which uses a plurality of augers. An unloading auger is used to begin removal of grain from a grain storage device. As the amount of grain decreases, a proximity sensor sends an activation signal to a cross auger that rests horizontally on the bottom of the grain storage device. The cross auger will pull the remaining grain to the entry point of an unloading auger. The unloading auger then removes the grain from the grain storage device.

BRIEF DESCRIPTION OF THE DRAWINGS

FIG. 1 is a top plan view of the grain storage device with two augers.

FIG. 2 is an elevated view as seen from the left-hand side of FIG. 1.

DETAILED DESCRIPTION OF PREFERRED EMBODIMENTS

Figure 3:
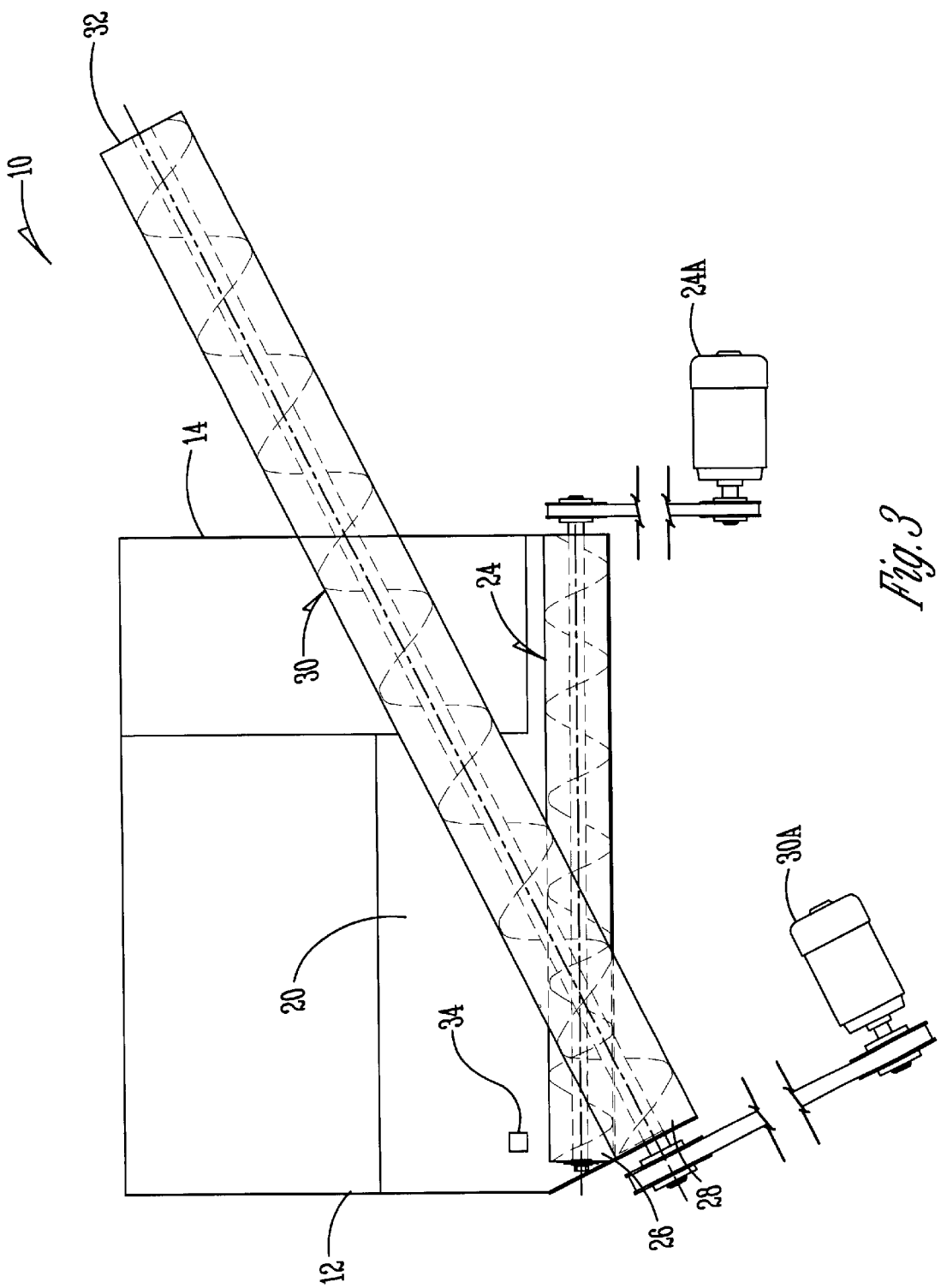
FIG. 3 is a sectional view taken on line 3—3 of FIG. 1.

The preferred embodiment of the present invention will be described as it applies to a grain storage bin or compartment. It is not intended that the present invention be limited to the described embodiment. On the contrary, it is intended that the invention cover all alternatives, modifications and equivalencies that may be included within the spirit and scope of the invention.

The grain storage compartment 10 has opposite end walls 12, 14 and opposite side walls 16, 18 which are best shown in FIG. 1.

With reference to FIG. 2, the grain storage compartment 10 has a sloping bottom 20 extending downwardly and away from the bottom edge of one side wall 16 to the bottom edge of the other side wall 18 forming a horizontal arcuate channel 22. During removal of the grain from the grain storage device 10 the slope 20 keeps the cross auger 24 supplied with grain by allowing gravity to draw the remaining grain into the cross auger 24. If the base were flat some grain would come to rest on the base and would not be extracted by the cross auger 24.

The cross auger 24 rests substantially horizontally on the base of the grain storage device 10. By resting horizontally, the cross auger 24, which is normally in an inoperative mode, is able to move the grain that is typically left in the bottom of the storage device towards the discharge end 26 of the cross auger 24. Adjacent to the discharge end 26 of the cross auger 24 is the intake end 28 of the unload auger 30. The unload auger 30 also has a discharge end 32 and like the cross auger, is connected to a motor 30A. Cross auger 24 is connected to a motor 24A. (See FIG. 3).

Finally, with reference to FIG. 3., a sensor 34 is mounted to the grain storage compartment 10 adjacent to the discharge end 26 of the cross auger. The sensor 34 is operatively connected to the motor of the cross auger.

To begin grain removal from the grain storage compartment 10, the operator firsts engages the unload auger 30. The unload auger begins to pull the grain through the intake end 28, out through the discharge end 32, and out of the grain storage device 10. As the grain is extracted the amount of the grain inside the grain storage device 10 decreases. The proximity sensor 34 located adjacent to the discharge end of the cross auger 24 senses when the grain level falls below the proximity sensor 34 and then engages the motor 24A of the cross auger 24. The cross auger 24 will continuously supply the unload auger 30 with grain allowing the unload auger 30 to pull the grain through the intake end 28 of the unload auger 30 and out the discharge end 32.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

What is claimed:

1. A grain storage compartment having opposite end walls, opposite side walls and a sloping bottom extending downwardly and away from a bottom edge of one side wall to a bottom edge of the other side wall and forming a horizontal arcuate channel;

a first horizontal auger in the arcuate channel having a single discharge end and being connected to a first motor, and being normally in a inoperative mode;

a second auger being inclined and having a single intake end adjacent the discharge end of the first auger and being connected to a second motor; and a proximity sensor mounted within the grain storage compartment adjacent the discharge end of the first horizontal auger and the intake end of the second auger and being operatively connected to the first motor to operate the first horizontal auger when the sensor detects an absence of grain at the location of the sensor;

the position of the sensor being such that it is normally directly submerged in grain within the grain storage compartment when the first motor is in an inoperative mode.

2. The grain storage compartment of claim 1 wherein the first auger transfers the grain in the horizontal arcuate channel to the discharge end of the first auger.

3. The grain storage compartment of claim 1 wherein the second auger transfers the grain from the discharge end of the first auger to a discharge end of the second auger.

4. The grain storage compartment of claim 1 wherein the first horizontal auger, when activated by the sensor, moves the grain collected in the arcuate channel to the discharge end of the first auger.

5. The grain storage compartment of claim 1 wherein the first motor and the sensor being the only motor and sensor to effect the operation of the first auger while the second auger is operating.

6. A method of unloading a grain storage compartment having a sloping bottom extending downwardly and away from a bottom edge of one side wall to a bottom edge of another side wall and forming a horizontal arcuate channel;

placing a first horizontal auger in the arcuate channel having a single discharge end and being connected to a first motor and being normally in an inoperative mode;

placing a second auger in an inclined position and having a single intake end adjacent the discharge end of the first auger and being connected to a second motor; and placing a proximity sensor mounted within the grain storage compartment adjacent the discharge end of the first horizontal auger and the intake end of the second auger and being operatively connected to the first motor to operate the first horizontal auger when the sensor detects an absence of grain at the location of the sensor;

positioning the sensor such that it is normally directly submerged in grain within the grain storage compartment when the first motor is in an inoperative mode.

7. The method of claim 5 wherein the first motor and the sensor being the only motor and sensor to effect the operation of the first auger while the second auger is operating.

\* \* \* \* \*